US008514540B2

(12) United States Patent
Besore et al.

(10) Patent No.: US 8,514,540 B2
(45) Date of Patent: Aug. 20, 2013

(54) SMART PLUG WITH INTERNAL CONDITION-BASED DEMAND RESPONSE CAPABILITY

(75) Inventors: John K. Besore, Prospect, KY (US);
Michael Thomas Bcycrle, Peewee Valley, KY (US)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 13/014,153

(22) Filed: Jan. 26, 2011

(65) Prior Publication Data
US 2012/0049639 A1 Mar. 1, 2012

(51) Int. Cl.
*H01H 31/34* (2006.01)
(52) U.S. Cl.
USPC ............................................. 361/116; 361/97
(58) Field of Classification Search
USPC .................................................... 307/97, 116
See application file for complete search history.

(56) References Cited

U.S. PATENT DOCUMENTS

| 4,341,345 | A  | * | 7/1982  | Hammer et al. | 236/46 R |
| 4,389,577 | A  | * | 6/1983  | Anderson et al. | 307/39 |
| 2006/0049694 | A1 | * | 3/2006  | Kates | 307/132 E |
| 2008/0140565 | A1 | * | 6/2008  | DeBenedetti et al. | 705/39 |
| 2011/0298300 | A1 | * | 12/2011 | Gray et al. | 307/116 |

OTHER PUBLICATIONS

General Electric Company, *Wireless DR Load Switch*, pp. 1-2.
JetLun Corporation, *Introducing JIM. The Jetlun Intelligent Management solution for energy—simple way to monitor, manage and reduce energy usage and carbon footpring. The Last Mile connectivity for the Smart Grid*, ww.jetlunc.com, 2009-2010.

* cited by examiner

*Primary Examiner* — Danny Nguyen
(74) *Attorney, Agent, or Firm* — Global Patent Operation

(57) ABSTRACT

A smart load switch or smart plug incorporates a built-in circuit that can monitor a physical variable condition and compare that sensed condition to data stored in a memory. A controller receives input data from the measuring device, compares the data to the reference data in memory, and selectively controls the on/off condition of a switch and thus the device that is plugged into the switch.

20 Claims, 2 Drawing Sheets

SMART PLUG WITH INTERNAL CONDITION-BASED DEMAND RESPONSE CAPABILITY

BACKGROUND OF THE DISCLOSURE

The present disclosure generally relates to energy management, and more particularly to energy management or demand supply management (DSM) of household consumer devices. The disclosure finds particular application in modifying or incorporating energy savings features and functions via a smart load switch that includes a built-in circuit that responds to incoming demand response signals from utilities to shed load and reduce operating costs for the homeowner. The concept will also find application with regard to various home devices such as window air conditioners, pool heaters, dehumidifiers, space heaters, water chillers, etc.

A number of companies are currently offering smart devices that are linked to a smart meter or to a home energy management (HEM) system which, in turn, is linked to the smart meter or linked to some other communication system. This allows the device to obtain data or inputs coming into a home area network from outside the home to trigger demand response events for the various devices. That is, utilities generally charge a flat rate but as fuel prices increase and there is an associated high energy usage during select parts of the day, utilities have become more sophisticated with regard to variable rates relating to the energy supplied to customers. Customers or homeowners may be charged a higher rate during peak demand when energy use is high and charged a lower rate when demand for energy is reduced. Consequently, operating a particular home device during the different rate periods can result in a substantial difference in energy cost to the homeowner.

Through use of smart systems, utilities are able to invoke demand response events that can, for example, adjust a thermostat set point based upon the ordering of a demand response event or based upon a specific tier price being announced. Such thermostat systems are typically used to control central heating, ventilation and air conditioning (HVAC) systems. Window air conditioner variants are currently being developed with integral smart systems that respond to similar aforementioned signals. Likewise, many companies are offering load switches that turn generic devices on or off (for example, those devices operating at 115 volts or 240 volts) based upon an incoming signal such as a demand response or a time of use schedule.

A need exists for a smart load switch or smart plug for a more sophisticated arrangement that can monitor specific control variables, for example room conditions, store data (for example, relating to set point conditions), receive input data from the measuring transducer, compare the data to the data stored in the memory and then selectively control power to a remote plug-in device.

SUMMARY OF THE DISCLOSURE

A load switch or smart plug is configured to monitor a physical variable, such as room temperature, in comparison to control the on and off condition of the plug.

In a preferred arrangement, the smart load switch includes a measuring device for monitoring a room condition, a memory for storing data relating to set point conditions, and a controller that receives input data from the measuring device, compares the input data to the set point data stored in memory, and selectively controls the on and off condition of a plug that receives an associated remote plug-in device.

The measuring device is a transducer that provides an output signal indicative of the physical variable, and in one embodiment is a thermocouple or thermistor.

The smart load switch may include a transceiver that receives the input data from a remote measuring transducer, whereby the transceiver is configured to communicate in a wireless format.

The smart load switch may include a remote located hardwired transducer that transmits input data through a hardwired connection to the smart load switch.

The smart load switch may include a remote located transducer that communicates input data to the smart load switch using PLC communications protocol along the 120V AC wiring.

The transceiver is configured to receive data regarding utility pricing data or peak demand events so that the controller is operative to compare the utility pricing data or peak demand event data stored in memory and alter operation of the switch in response thereto.

The controller may be configured to change the set points in response to a peak pricing or demand event.

Software of the controller may compensate for histories as to prevent short cycling of the switch and, in one exemplary use, evaluates a rate of change of a sensed temperature to determine if the switch is controlling a heating or cooling mode.

The software may also preclude immediate restart after a shutdown so that a time delay insures a minimum on or off time for the associated plug-in device.

A method of controlling a plug-in device includes measuring a physical condition, storing data in a memory relating to set point conditions, receiving input data from the measuring transducer, comparing the measured data to the set point data stored in memory, and selectively controlling an on/off condition in response thereto of a switch that receives an associated remote plug-in device.

The method may include delaying/maintaining operation of the associated plug-in device for a minimum time period.

The method may include evaluating a rate of change of a sensed temperature to determine if the switch is controlling a heating or cooling mode.

An interface may allow a user to select set points in modes of operation of the associated plug-in device.

A primary benefit of the present disclosure is the ability to equip non-smart based devices with the ability to shed load and reduce operating costs for the homeowner in response to incoming demand response signals.

Another advantage resides in the ability to include old design devices in the areas where manufacturers are lacking in adapting their products to the new smart technology.

Still other benefits and advantages of the present disclosure will become more apparent upon reading and understanding the following detailed description.

DETAILED DESCRIPTION OF THE PREFERRED EMBODIMENTS

Figure 1:
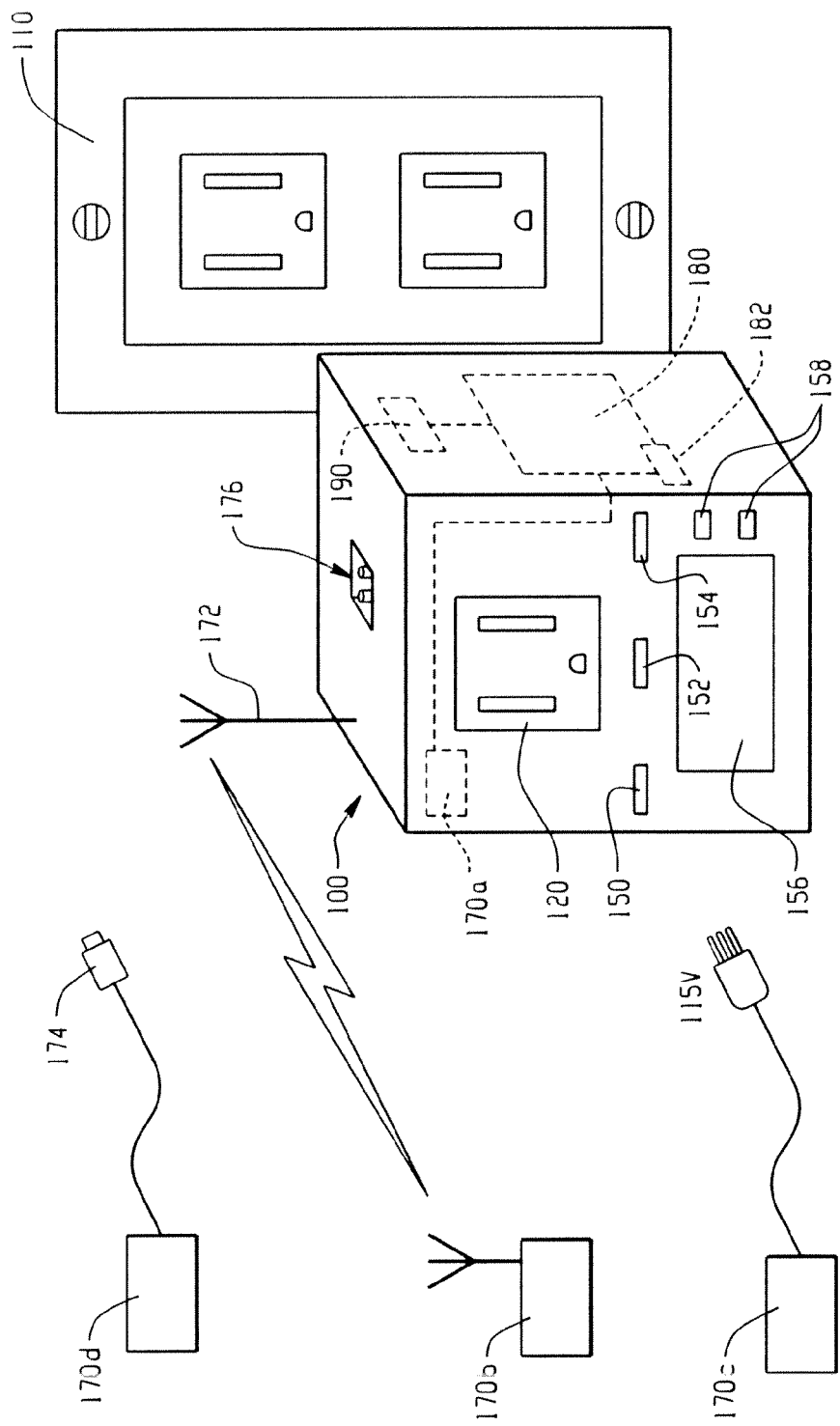
FIG. 1 is a view of the smart load switch.
Figure 2:
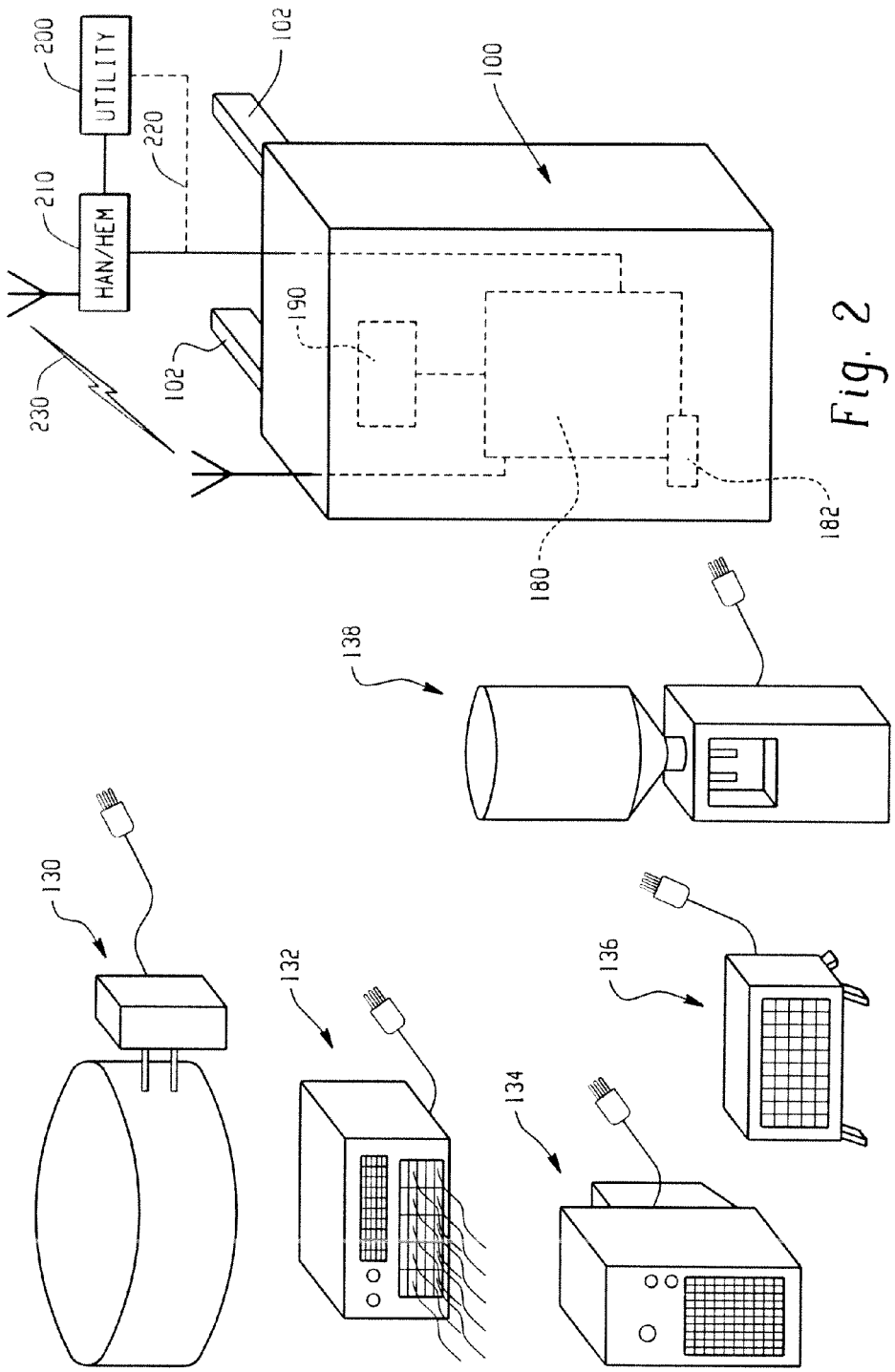
FIG. 2 is a side view of the smart load switch and a schematic representation of various devices that may be plugged into the smart load switch.

Turning to the FIGURES, there is shown a smart load switch or smart plug 100 that includes electrical contacts 102 (FIG. 2) for receipt in a grounded receptacle 110 (FIG. 1). In addition, the smart load switch 100 includes a receptacle 120 shown here as being on the surface opposite that of the electrical contacts 102 (although that need not necessarily be the case) for receipt of plug contacts associated with a remote plug-in device such as a pool heater 130, a window air conditioner 132, a dehumidifier 134, a space heater 136, or a water chiller 138. Each of these remote plug-in devices has an electrical cord that is adapted for receipt in an electrical receptacle 110, and as a result of the present disclosure, is instead received in the receptacle portion 120 of the smart load switch which, in turn, is received in or plugged in to the electrical receptacle 110. The various remote plug-in devices shown in FIG. 2 are exemplary only and, as one skilled in the art will understand, are not deemed to be comprehensive or preclude other plug-in devices. However, these devices are representative of various devices that can be made to operate like a smart appliance and still result in the ability to shed load in response to a demand response signal from a utility and thereby reduce the operating costs for the homeowner. The smart load switch 100 may include indicia such as one or more LEDs 150, 152, 154, that represent that the smart load switch has power, and/or may indicate a demand response level. In addition, a display 156 and one or more inputs 158 are preferably provided to allow a homeowner to input data, scroll through information, change set points, etc.

In addition, the smart load switch 100 includes a measuring device 170 (various forms 170a-d to be described below) that monitors a physical variable such as room temperature, humidity, water temperature, etc. Typically, the measured physical variable is one that impacts performance or efficiency of the appliance or other device plugged into the receptacle 120 (e.g., room temperature is sensed for a window air conditioner). Various forms of acquiring physical data at the smart load switch 100 are contemplated. For example, the measuring device may be an internal transducer 170a residing inside the smart load switch 100 but preferably isolated from other heat sources internal to the switch. Alternatively, the measuring device may be an external transducer 170b communicating variable data to the switch 100 via a radio frequency (RF) transducer (e.g., signal coming in through antenna 172). Still another possibility for the measuring device is an external transducer 170c that communicates with the smart load switch 100 via PLC communications. Yet another option is to provide an external transducer 170d as the measuring device that communicates (sends data) along a wire through a hard-wired connection between the transducer 170d and the smart load switch 100. For example, this hard-wired connection can be connected through a connector 174 on the transducer 170d that is received in mating connection terminal 176. The physical variable condition measured by the measuring device 170 is communicated to controller or microprocessor 180 which, in turn, selectively accesses data or information stored in memory 190. Thus, the controller 180 receives input data of a physical variable condition from the measuring device 170, includes a processor or microprocessor 182 to manage the transducer and the transceiver, runs installed software, compares the computed data with that stored in memory 190, and then in response selectively controls the on/off condition of the switch and likewise, the associated remote plug-in device.

By way of example only, window air conditioner 132 is plugged into the receptacle 120 of the smart load switch 100 which is likewise plugged into the wall receptacle 110. The room temperature is monitored via sensor 170. The sensed temperature is communicated to the controller 180 which selectively compares this data with set points, such as maximum and minimum temperature set points, stored in memory 190. If a demand response event occurs that requires a change in operation of the plug-in device, the utility 200 or home appliance network or home energy manager 210 sends a wired or wireless signal (220, 230, respectively) to the smart load switch 100. This data or information is communicated to the controller 180. Via the interface, the set points may be altered by the homeowner or there may be preprogrammed set points stored in the memory. A comparison with the modified set points is made in a high or critical event which typically signifies an increased price that would be incurred by the homeowner. In some instances, such as a critical demand event, the smart load switch may discontinue operation of the remote plug-in device until the critical demand level is terminated. Thus, the measuring device may be a transducer that provides an output signal indicative of the physical variable. In the example of a window air conditioner, the transducer is one of a thermocouple or a thermistor. The transceiver receives the temperature data from the thermocouple or thermistor and communicates the data to the controller. In addition, the transceiver is configured to receive data regarding utility pricing data or peak demand events. The controller is operative to compare the pricing data associated with the peak demand event or simply compare the peak demand signal with stored data in the memory.

As a result, operation of the smart load switch may be altered, set points can be changed, or still other action invoked by software residing in the smart load switch. For example, a short cycling preventer may be desired to preclude immediate restart of the window air conditioner after a shut-down. A time delay may be incorporated into the delay to insure a minimum on or off time for the associated plug-in device. The sensor may also be of the type that measures both indoor and outdoor air temperatures so that the controller can deactivate the refrigeration system associated with the window air conditioner and selectively draw outdoor air into the room as needed. In still other arrangements, the homeowner can input selected operational parameters such as setting the set point temperature through input controls 158. The controller may be configured to selectively adjust at least one or more power consuming features or functions to reduce power consumption of the window air conditioner in an energy savings mode. Reducing total energy consumed also includes the energy consumed at peak times and/or reducing overall electricity demands, where electricity demands are defined as average watts over a short period of time on the order of five (5) minutes to several hours.

The air conditioner 132 has a set point temperature and a normal operating mode for cooling, for example, of 72° F. A room air sensor provides an input temperature signal and if that input temperature is at 75° F. or greater (+3° F.) the compressor is activated. Likewise, the compressor can be turned off at another set point, i.e., −3° F. or 69° F. Thus, the air conditioner operates in a normal operating mode.

A utility or demand response signal communicated to the controller may cause a consumer to change power consumption. The software may alter operation of the window air conditioner by establishing higher set points that may be pre-programmed or selected by the homeowner to be responsive to a peak pricing period. Likewise, indication of operation of a demand supply mode may be illustrated by illuminating an LED(s) to indicate same. The controller can access the look-up table in the memory and the software implement a desired change in operation of the window air conditioner (e.g., institute a percentage increase or change the temperature set point by a preselected amount). Alternatively, the set point may be altered for a specified period of time.

Likewise, the controller can analyze the recent operation of the window air conditioner, such as the last hour of operation. If the window air conditioner has been operational for the last hour, then the controller may analyze the temperature slope to determine if the slope is shallow, i.e., nearing stabilization to the set point, or whether the slope is steep. If the slope is shallow, the appliance executes a delta-T ($\Delta T$) or change in temperature offset request. On the other hand, if the slope is steep, which is an indication that the unit has been operating in a one-hundred percent (100%) cycle condition and not achieving the set point temperature the user selected, the controller 180 of the smart load switch 100 deter wines the percentage load reduction from a memory or look-up table stored in memory 190 based on the steepness of the stability slope. In this manner, the controller 180 executes a percentage load reduction program for a specified amount of time. The controller 180 can be responsive to recorded historical data stored in memory 190 of the smart load switch 100 associated with operation of the window air conditioner. It will be appreciated that the concept of a steep/shallow slope may vary from one home to another, and that such a slope can be provided by a look-up table established by the manufacturer and/or is customized or changed by the homeowner to establish how quickly the appliance reaches a desired set point.

Rather than inferring recent run time or operation of the appliance (such as the exemplary window air conditioner by analyzing temperature slope curves), the smart load switch may include a means to monitor power being used or pulled by the device or appliance (i.e., window air conditioner in this example). One such monitoring means is a current transducer that is operatively associated with the smart load switch 100 and the memory 190 so that actual power used by the window air conditioner or similar appliance is monitored, data stored in memory 190 regarding power usage, and the controller 180 analyzes the "power used" data in order to modify operation of the device or appliance plugged into the smart load switch.

In response, the compressor run time may be reduced by some percentage and the on/off times of the compressor analyzed to achieve a desired load reduction if a percentage load reduction is initiated, it may be for a specified length of time. For example, run time data may be stored in a memory table and the controller analyzes the stored data from the previous two (2) hours of operation over the last twenty-four (24) hours. The data for the same time period for the last two consecutive days can also be considered. From these calculations, the appliance controller can adjust an average run time by a specified percentage reduction.

Still another feature is to determine whether the compressor has been operated for a minimum of three (3) minutes on. If not, the control signal that requests that the compressor be terminated will be ignored or overlooked until the three minute time period has lapsed. Likewise, if the compressor has not been off for a consecutive period of three (3) minutes, the controller will prevent activation of the compressor until the three minute off time limit has been exceeded. One skilled in the art will recognize that this described responsive action and the noted time periods are exemplary only.

The overall switch layout will preferably provide thermal isolation from any components that might interfere with the physical variable measurement. For example, if the physical variable is temperature, then potential heat sinks, integrated circuits, transistors, or other electrical components that heat during use and could adversely impact the measured room temperature provided by the thermocouple or thermistor, are shielded from the sensor. This assumes that the transducer is residing within the smart energy switch. Obviously, this design criterion is not relevant in cases where the transducer is remotely located and transferring data to the switch via a wireless, PLC, or hard-wire connection. It is also contemplated that a homeowner or user of the smart energy switch would have the option to specify whether the smart energy switch is responsive to an internal sensor or a remote sensor to switch inputs from one to the other as desired.

The transceiver can receive the communication inputs via WiFi, broadband, Zigbee, FM RDS, or any other RF format commonly used in the industry. The radio will likely be receiving and transmitting packets of information to and from the smart load switch. Alternatively, the communication could be another form such as a power line communication (PLC), or still other non-radio format based formats. The switch can also incorporate a display to communicate information to the user or homeowner and allow the homeowner to make desired selections of access information. For example, the homeowner can set the desired set point temperature for the smart load switch to cycle off the appliance that is attached to it. Likewise, in the event of a demand response event or a price tier change, the switch can be pre-programmed to shift the set point by a specific number of degrees to lessen the average run time or analogously the load on the grid. The smart load switch will thereby be responsive to lower or raise the set point by knowing whether the plugged-in device is a heating or cooling device. Alternatively, the user/homeowner could manually set the number of degrees the device is to shift the set point for a given demand response input. The on-board control of the window air conditioner can be set to high or a one-hundred percent (100%) run condition and the subject switch would assume responsibility for cycling control of the window air conditioner. The window air conditioner can be cycled on and off as the load switch internal temperature transducer is satisfied or not.

It will also be evident to one skilled in the art that other transducers can be incorporated into the load switch to control different appliances. For example, a humidistat could be the sensor used in association with a dehumidifier. Sensing the temperature of the water in the water cooler 138 or the temperature of the water of a pool and the associated heater 130 are still other examples of physical variables that may be monitored, although this list is not deemed to be exhaustive.

The disclosure has been described with reference to the preferred embodiments. Obviously, modifications and alterations will occur to others upon reading and understanding the preceding detailed description. It is intended that the disclosure be construed as including all such modifications and alterations.

What is claimed is:

1. A smart load switch for monitoring a physical variable condition and controlling operation of an associated plug-in device in response to the monitored condition comprising:
   a housing;
   a measuring device configured to monitor a physical variable condition, the measuring device isolated from any components within the housing of the smart load switch that interfere with the physical variable condition;
   a memory configured to store data relating to reference conditions; and
   a controller configured to at least (i) receive input data from the measuring device, (ii) compare the data to the reference data stored in memory, and (iii) selectively control an on/off condition of the switch to, in turn, control operation of the associated remote plug-in device;
   wherein the measuring device, the memory and the controller are located within the housing.

2. The smart load switch of claim 1 wherein the measuring device is a transducer that provides an output signal indicative of the physical variable.

3. The smart load switch of claim 2 wherein the transducer is one of a thermocouple and thermistor.

4. The smart load switch of claim 1 further comprising a transceiver that receives the input data from the measuring device.

5. The smart load switch of claim 4 wherein the transceiver is configured to communicate in a wireless or wired format.

6. The smart load switch of claim 5 further comprising a receptacle to accept a connector from a remote hard-wired transducer.

7. The smart load switch of claim 5 wherein the transceiver is configured to receive data regarding utility pricing data or peak demand events, the controller is operative to compare the utility pricing data or peak demand events with stored data in the memory, and to alter operation of the switch in response thereto.

8. The smart load switch of claim 7 wherein the controller changes the reference data in response to a peak pricing or demand event.

9. The smart load switch of claim 1 further comprising an interface that allows access and selection capability for a user.

10. The smart load switch of claim 1 further comprising a short cycling preventer that precludes immediate restart after a shutdown.

11. The smart load switch of claim 10 wherein the short cycling preventer includes a time delay for ensuring a minimum on or off time for the associated plug-in device.

12. The smart load switch of claim 1 further comprising a current sensor that is operatively associated with the controller and monitors current used by the associated remote plug-in device.

13. A method of controlling a remote plug-in device comprising:
providing a load switch comprising a housing, a measuring device configured to monitor a physical variable condition, the measuring device isolated from any components within the housing that interfere with the physical variable condition, a memory, and a controller, wherein the measuring device, the memory and the controller are located within the housing;
measuring the physical variable condition with the measuring device;
storing data in the memory relating to set point conditions;
receiving input data from the measuring step and comparing the measured data to the set point data stored in the memory; and
selectively controlling an on/off condition of the load switch in response to reaching the set point condition and, in turn, controlling operation of the associated remote plug-in device.

14. The method of claim 13 further including receiving the input data from the measuring device and changing the on/off condition of a smart plug that receives the associated remote plug-in device.

15. The method of claim 13 further including delaying/maintaining operation of the associated plug-in device for a minimum time period.

16. The method of claim 13 further including evaluating a rate of change of a sensed temperature to determine if the switch is controlling a heating or cooling mode.

17. The method of claim 13 further including evaluating a rate of change of any variable to determine at least one of multiple operating modes of the device plugged in to the smart energy switch.

18. The method of claim 13 further including providing an interface to allow a user to select set points and modes of operation of the associated plug-in device.

19. The method of claim 13 wherein the measuring step includes measuring a temperature of the room, and the set point conditions are preselected temperatures.

20. The method of claim 19 further comprising altering the set point temperatures in response to a peak demand signal.

* * * * *

UNITED STATES PATENT AND TRADEMARK OFFICE
CERTIFICATE OF CORRECTION

PATENT NO. : 8,514,540 B2
APPLICATION NO. : 13/014153
DATED : August 20, 2013
INVENTOR(S) : Besore et al.

It is certified that error appears in the above-identified patent and that said Letters Patent is hereby corrected as shown below:

On the Title Page, in Item (56), under "OTHER PUBLICATIONS", in Column 2, Line 4, delete "footpring." and insert -- footprint. --, therefor.

In the Specification

In Column 3, Line 52, delete "microprocessor 180" and insert -- microprocessor 182 --, therefor.

In Column 5, Line 12, delete "deter wines" and insert -- determines --, therefor.

Signed and Sealed this
Twenty-second Day of October, 2013

Teresa Stanek Rea
*Deputy Director of the United States Patent and Trademark Office*